(12) United States Patent
Erez et al.

(10) Patent No.: US 12,061,791 B2
(45) Date of Patent: Aug. 13, 2024

(54) SYSTEM AND METHOD FOR RETRIMMING REMOVABLE STORAGE DEVICES

(71) Applicant: Western Digital Technologies, Inc., San Jose, CA (US)

(72) Inventors: Eran Erez, Bothell, WA (US); Joseph R. Meza, Bernallio, NM (US); Dylan B. Fairchild, Mission Viejo, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 79 days.

(21) Appl. No.: 17/901,157

(22) Filed: Sep. 1, 2022

(65) Prior Publication Data
US 2024/0078009 A1    Mar. 7, 2024

(51) Int. Cl.
*G06F 3/06* (2006.01)

(52) U.S. Cl.
CPC .......... *G06F 3/0607* (2013.01); *G06F 3/0604* (2013.01); *G06F 3/0622* (2013.01); *G06F 3/0631* (2013.01); *G06F 3/0644* (2013.01); *G06F 3/0679* (2013.01)

(58) Field of Classification Search
CPC ..... G06F 3/0604; G06F 3/0644; G06F 3/0679
See application file for complete search history.

(56) References Cited

U.S. PATENT DOCUMENTS

| | | |
|---|---|---|
| 9,535,628 B2 | 1/2017 | Zaltsman et al. |
| 9,727,570 B2 | 8/2017 | Post et al. |
| 10,089,348 B2 | 10/2018 | Park et al. |
| 11,048,662 B2 | 6/2021 | Kim et al. |
| 11,232,022 B2 | 1/2022 | Jeong et al. |
| 2007/0067593 A1* | 3/2007 | Satoyama ............... G06F 3/065 711/113 |
| 2015/0205717 A1* | 7/2015 | Lin ...................... G06F 3/0659 711/103 |
| 2015/0234603 A1 | 8/2015 | Kitagawa et al. |
| 2017/0322727 A1 | 11/2017 | Yeh |
| 2019/0377512 A1 | 12/2019 | Hodes et al. |
| 2020/0310696 A1 | 10/2020 | Eliash et al. |
| 2021/0318821 A1 | 10/2021 | Sato |

FOREIGN PATENT DOCUMENTS

CN        111639008 A    9/2020

* cited by examiner

*Primary Examiner* — Jae U Yu
(74) *Attorney, Agent, or Firm* — Morgan, Lewis & Bockius LLP

(57) ABSTRACT

A data storage device includes a host interface for coupling the data storage device to a host system. The data storage device also includes a device memory and a controller. The controller is configured to determine if a retrim is needed for the data storage device. In accordance with a determination that the retrim is needed, the controller is configured to identify a time to initiate a new trim on the data storage device, and cause the new trim on the data storage device at the time identified.

20 Claims, 9 Drawing Sheets

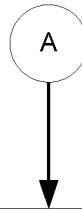

218 Determine if a retrim is needed based on timestamp attributes for prior trims 220 The timestamp attributes include at least one of data units written, a power cycle count, power on hours, and a date and time for the prior trims 222 Determine if the retrim is needed by identifying a condition selected from the group consisting of:

224 A retrim issued less than a predetermined time in the past

226 A retrim issued less than a predetermined number of power cycles in the past 228 A retrim issued less than a predetermined number of power ons in the past 230 A retrim issued less than a predetermined percentage written storage capacity 231 Device namespace utilization is within less than a predetermined percentage

Figure 2B

SYSTEM AND METHOD FOR RETRIMMING REMOVABLE STORAGE DEVICES

BACKGROUND

Semiconductor memory devices, including flash memory, typically utilize memory cells to store data as an electrical value, such as an electrical charge or voltage. A flash memory cell, for example, includes a transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Removable solid-state drive (SSD) is typically a universal serial bus (USB) interface device that is formatted with an extensible file allocation table (exFAT) file system. USB rates have increased rapidly from one generation to another. At the same time, not-and (NAND) write rates have decreased from one density to another. For example, a quad-level cell (QLC) has a lower write rate than a triple-level cell (TLC) which in turn has a lower write rate than a single level cell (SLC). To compensate for dropping write rates while maintaining good user experience, hybrid SLC architecture has been developed. With hybrid SLC, host data is written to NAND blocks configured as SLC, at a high speed. In the background, the device clears space out of the hybrid SLC, making room for future write bursts. This way, user experiences mostly SLC write speeds. Hybrid SLC burst space is allowed only if the device has excess free space. This is because writing in SLC mode takes three times more NAND space than TLC.

To take advantage of the hybrid SLC architecture, the storage device needs to know what logical block addresses (LBAs) are free. A host trim (unmap) operation conveys free LBA information to the device. A trim is typically issued by the host following file deletion. Some trims may not be serviced by the device. To address such case, a retrim is issued periodically (e.g., weekly). A problem is that major operating systems such as Windows, iOS and Linux do not issue trim to an exFAT formatted device. Even if a host does support trim, the device's trim history is unknown. For example, if the device has been previously connected to a host that did not support trim, that information may be unavailable. So large segments may not be trimmed. Finally, a removable device poses a special challenge because such device may be plugged for a duration shorter than the operating system's periodic retrim event.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

FIGS. 2A-2H show a flowchart of an example process for retrimming a removable storage device, according to one or more embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to data storage systems and methods, and more particularly to, for example, without limitation, retrimming removable storage device.

Figure 1A:
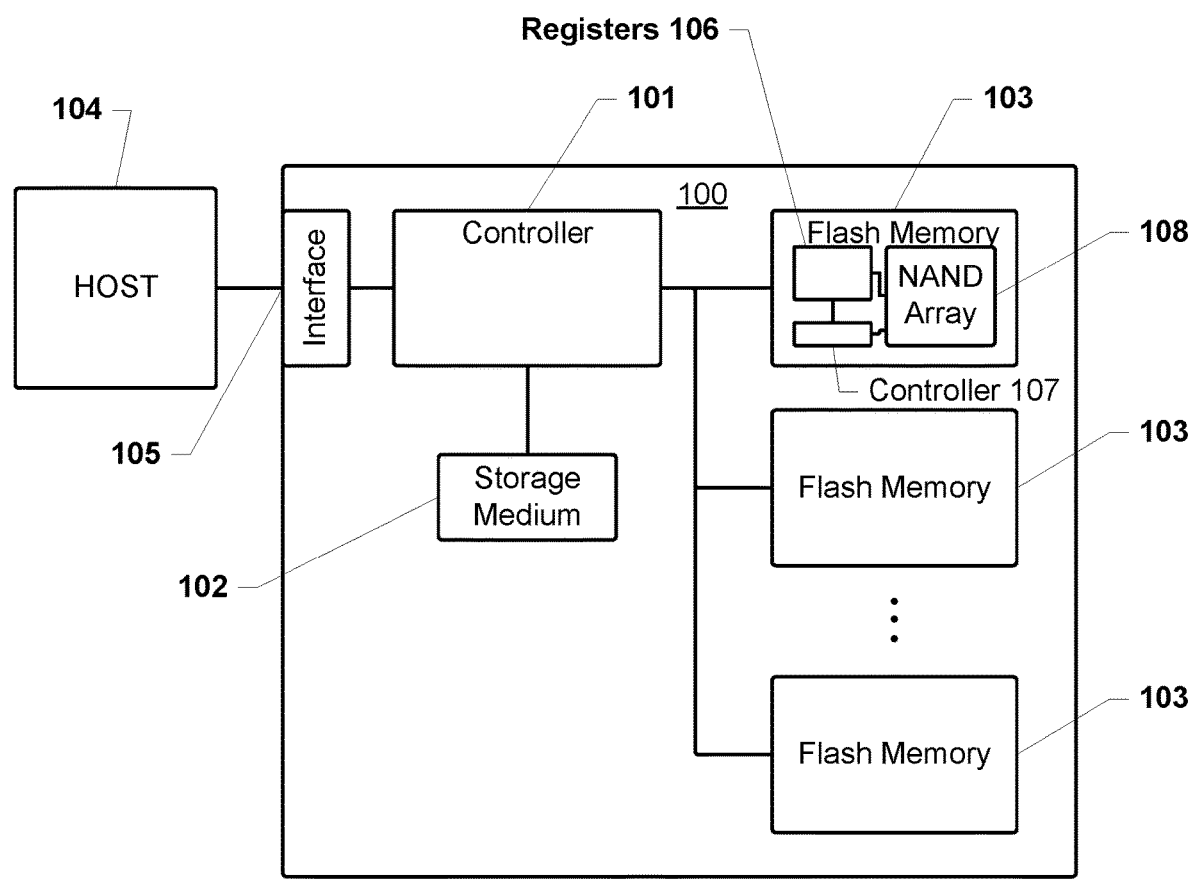
FIGS. 1A and 1B are block diagrams illustrating components of an example data storage system, according to one or more embodiments.

FIG. 1A is a block diagram illustrating components of an example data storage system, according to aspects of the subject technology. As depicted in FIG. 1A, in some aspects, a data storage system 100 (e.g., a solid state drive (SSD)) includes a data storage controller 101 (sometimes called a controller), a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, all of these elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. A processor may be a microprocessor, a microcontroller, or a digital signal processor (DSP). A processor may be implemented using for example, an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g, via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage medium 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host or a host system.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAM may be also used to implement the storage medium 102. The storage medium 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1A, the data storage system 100 may also include the host interface 105. The host interface 105 may be configured to be operably coupled (e.g, by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 (sometimes called the host) and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101.

The flash memory 103 may represent a non-volatile memory device for storing data. According to aspects of the subject technology, the flash memory 103 includes, for example, a NAND flash memory. The flash memory 103 may include a single flash memory device or chip, or (as depicted in FIG. 1A) may include multiple flash memory devices or chips arranged in multiple channels. The flash memory 103 is not limited to any particular capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g, to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Figure 1B:
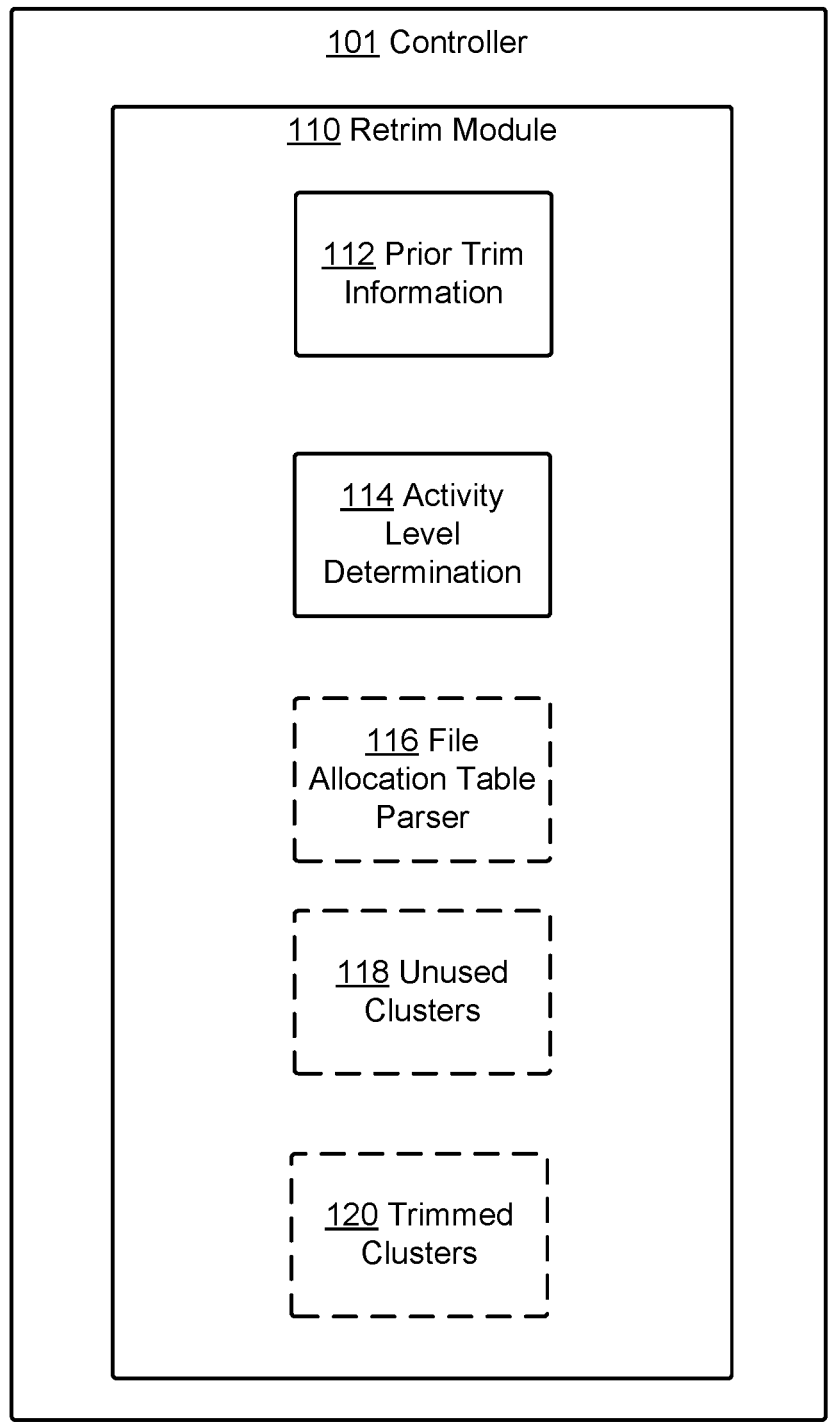

FIG. 1B is a block diagram illustrating a retrim module 110 within the controller 101. In some aspects, the retrim module 110 may contain prior trim information 112 and an activity level determination module 114. In some aspects, the retrim module 110 may contain a file allocation table parser 116. The file allocation table parser 116 may parse a file allocation table to determine which clusters are allocated within the device exported capacity. Only the allocated clusters should be maintained whereas other clusters could be trimmed. If the file allocation table parser 116 finds unallocated clusters, the retrim module 110 may send a trim command to trim unallocated clusters. It is possible that unallocated clusters are already trimmed by the device. In such cases, the retrim module 110 may decide not to issue a trim command for those clusters. Alternatively, the retrim module 110 may issue a trim command to previously trimmed clusters and the device may complete the operation (no-op). Once the trim command is executed and completed by the retrim module 110, the trimmed clusters table 120 may be updated.

In some aspects, the retrim module 110 may determine when retrim is needed, wait for a retrim opportunity (or slot), perform retrim, and/or provide a status to the host which can be used for a user progress bar, for retrimming a removable device.

Retrim may be scheduled and/or executed by either a host (e.g., the host 104) or a device (e.g., the retrim module 110 in the controller 101 of the data storage system 100). The retrim may be performed by either a host application, leveraging host interface trim (unmap) commands, or autonomously by the storage device without direct host request. Depending on the entity performing the retrim, some steps may be different. The description herein uses the example of a host performing a retrim. Some embodiments provide a host tool to process the retrim. The host tool may be a device management tool (sometimes called a dmtool).

Example Method for Determining when Retrim is Necessary

Newly plugged device identification may be registered in the dmtool of the host which may log the event in dmtool memory. Dmtool memory may be long term and survives power cycle, such memory may be placed either on the storage dmtool runs from (e.g., c:\ drive), directly on the removable device, or a combination of both. Dmtool of the host may read removable device attributes. The attributes may include data units written, power cycle count, power on hours, date and time, namespace utilization (the current number of logical blocks allocated to the namespace or in other words—untrimmed). Some attributes may only be available to a host (e.g., date and time) and some attributes may only be available to a device (e.g., namespace utilization). A collection of these attributes may be referred to as a timestamp. Dmtool may have previous device retrim timestamp in dmtool memory.

Dmtool of the host may evaluate device based on the timestamp. Retrim may not be required in the following conditions:
  newly registered device with less than 10% total written volume of capacity,
  if retrim was issued within less than 7 days ago,
  if retrim was issued within less than 10 power cycles ago,
  if retrim was issued within less than 4 power on hours ago,
  if retrim was issued within less than 10% written volume of capacity, and/or
  if device namespace utilization is within less than 70%.

Instead, or in addition to above timestamp method, an alternative determination may be used for comparing free space from device and file system point of view. If both points of view are close enough then retrim is not needed. For this purpose, the device may support a host query to report free space. Alternatively, device may autonomously parse the file system and compare the file system view and device logical free space.

Example Method for Waiting for Retrim Opportunity

If retrim is required, then the device or the host may provide an appropriate notification to a user and then wait for device low activity. Subsequently, the dmtool or the device initiates retrim. Reason for the wait is to avoid retrim in a timing which may interrupt user experience.

An example device low activity determination algorithm that may be implemented in the activity level determination module 114 is shown below:

T=60 seconds; M=10 MB
For every T:

```
If
   Volume transferred in the last T seconds is less than M; and
   Volume transferred in the last T/2 seconds is less than M/2; and
   Volume transferred in the last T/4 seconds is less than M/4; and
Then, device low activity period identified
Else, if M < 600, then M = M + 10 MB
```

Above algorithm may raise the bar for inactivity until at some point when retrim may be forced even if in the middle of user mild workload.

Example Method for Executing Retrim

A host retrim service may be available (e.g., Windows host and removable device is formatted with NTFS file system). Otherwise, if the host file system supports exFAT, then the retrim module 110 and/or the host may execute retrim in 1 second steps as follows:
  Loop while a trimmed clusters table (e.g., the table 120) does not include all unused clusters (e.g., the unused clusters 118):
    1. Obtain storage device exclusivity (any other entity device access is denied).
      a. If the host issues the trims, then block any other host application from accessing the device during this process.
      b. If device issues the trims, then pause receiving any new incoming commands, and complete any ongoing command before proceeding with the trim process.
    2. Parse exFAT metadata (e.g., using the file allocation table parser 116 described below) to figure out unused clusters (e.g., using Allocation Bitmap).

3. For a duration of 1 s, issue Trim (unmap) to yet untrimmed, unused clusters
4. Update "trimmed clusters table" for next step.
5. Release storage device exclusivity.
   a. If device issues the retrims, then allow receiving new commands.
6. Mark existing logical block address (LBA) location, to resume trim from this location on next iteration
7. Wait for 2 seconds before next stop.

Mark the retrim complete and store a timestamp (e.g., data units written, power cycle count, power on hours, namespace utilization) in memory (e.g., dmtool memory, a hidden file).

Example exFAT Execution—Parsing File System and Trimming Device Sectors

The file allocation table parser 116 may use the techniques described herein, for parsing a file allocation table. An exFAT partition contains an exFAT boot sector which describes information about the exFat partition. This includes the total number of sectors, the location and length of the file allocation table (FAT), and the size of a sector and the size of a cluster.

| Field name | Offset (Byte) | Size (Byte) | Description |
| --- | --- | --- | --- |
| File system name | 3 | 8 | "exFAT" |
| Volume length | 72 | 8 | Total number of sectors |
| FAT offset | 80 | 4 | Sector address of first FAT |
| FAT length | 84 | 4 | Size of FAT in sectors |
| Cluster offset | 88 | 4 | Starting sector of cluster heap |
| Cluster count | 92 | 4 | Number of clusters |
| Root directory | 96 | 4 | First cluster of root directory |
| Volume flags | 106 | 2 | Bit 0-Active FAT (0-first, 1-second) Bit 1-Volume dirty (0-clean, 1-dirty) Bits 2 & 3-Media failure (0-no failures, 1-failures reported) |
| Bytes per sector | 108 | 1 | This is power of 2; minimal value is 0; $2^9$ = 512 Bytes and maximum $2^{12}$ = 4096 Bytes. |
| Sector per cluster | 109 | 1 | This is power of 2; minimal value is 1; $2^0$ = 1 sector (512 Bytes) and maximum 32 MB cluster size in bytes. |
| Number of FATs | 110 | 1 | Either 1 or 2; if TexFAT is unsupported then it will be 2. |

ExFat file systems manage clusters which are multiples of sectors. To accommodate larger size capacities, the size of a cluster is larger for larger capacities.

| Volume Size | Cluster Size |
| --- | --- |
| 7 MB to 256 MB | 4 KB |
| 256 MB to 32 GB | 32 KB |
| 32 GB to 256 TB | 128 KB |

A file allocation table (FAT) is a table with entries describing both individual files and directories. Each entry in the FAT may have a specific "type." The information contained within an entry may differ depending on the type of the entry, but example attributes may include time stamps for when the entry was created and/or modified, the name of the file and/or directory, and other attributes such as if the file is read only, hidden, or a system file. One of the entry types may be type 0x81 which may define the location and size of an allocation bitmap. An allocation bitmap keeps track of the allocation status of clusters. The allocation bitmap may consist of a set number of 8-bit bytes which may be treated as a sequence of bits with each bit in the bitmap corresponding to a cluster. If the bit is set to 1, the cluster may be occupied, and accordingly, and if the bit is set to 0, the cluster may be free. In some aspects, the file allocation table parser 116 may parse the FAT to identify an entry indicating the allocation bitmap. In the example above, such entry would consist of type 0x81. The file allocation table parser 116 may then parse the file by reading each byte of the bitmap. Any bit in the bitmap set to zero may indicate an unused cluster that may be trimmed.

Example Method for Determining Clusters to Trim

As previously mentioned, the FAT contains entries which are identified as "types." These types of entries are listed below.

| Type Identifier | Description |
| --- | --- |
| 0x81 | Allocation Bitmap |
| 0x82 | Up-case Table |
| 0x83 | Volume Label |
| 0x85 | File |
| 0xA0 | VolumeGUID |
| 0XA1 | TexFAT Padding |
| 0xA2 | Windows CE Access Control Table |
| 0xC0 | Stream Extension |
| 0xC1 | File Name |

The upper most bit for all Type Identifiers is always set to 1. This indicates the field is valid. When a file is deleted and/or an entry from the Table is removed, the upper most bit is set to 0. As an example, if a file entry 0x85 is deleted, rather than zero out the entry, the first bit is set to 0, resulting in a value of 0x05.

| Hex | Binary |
| --- | --- |
| 8 | 1000 |
| A | 1010 |
| C | 1100 |

The content of the FAT entry is still readable, and therefore, software parsing the FAT table would be able to identify deleted entries. This is typically how recovery software works. However, a FAT entry could be re-used if a new file is created. The file system software may reuse an entry that had been previously marked as deleted. In this case, those deleted file entries are overwritten and it would therefore be impossible to recover file data if this occurs.

If the file entry is marked as deleted, the file allocation table parser 116 may parse the file entry to determine the clusters allocated for the deleted file. The clusters can be converted into LBAs and the list of LBAs may be sent in a trim command to trim the LBAs associated with the deleted file. As an option, the File Entry could be modified to indicate to the parser that the associated LBAs have already been trimmed for the file. Perhaps a marker, like 0x7F. As long as the upper most bit is not set, almost any value could be used.

Alternatively, or in conjunction with parsing the FAT table itself, the parser could parse the FAT table to identify the entry with type 0x81, which is the Allocation Bitmap. The parser could then parse this file by reading each byte of the bitmap. Any bit that is set to zero, is a cluster that is not currently being used. The parser 116 may transmit a TRIM for the LBAs which comprise the cluster. This method is inefficient and does not provide for a mechanism to mark the cluster as trimmed. Since every unallocated cluster would be trimmed, this operation could take a very long time.

In some aspects, the parser 116 may stop after it encounters a long series of 0's. This may indicate that this area of the device has yet to be written and thus, no need to initiate a trim for this area. The number of 0's is somewhat arbitrary, as a large file (e.g., a 4 GB file) could have been deleted. If the clusters were allocated contiguously, this would result in 131,000 consecutive zeros in the allocation bitmap.

FIGS. 2A-2H are a series of flowcharts depicting an example process of performing a retrim command. One or more blocks of FIGS. 2A-2H may be executed by a computing system (including, e.g., a controller 107 of a flash memory, a retrim module 110, a data storage controller 101 of a data storage system 100 or a solid-state storage device (SSD), a processor, or the like). Examples of a computing system or a controller may be the controller 101. Similarly, a non-transitory machine-readable medium (e.g., 102 or a memory within the controller 101) may include machine-executable instructions thereon that, when executed by a computer or machine (e.g., 101, 110), perform the processes of FIGS. 2A-2H. The steps of process 200 may be implemented as hardware, firmware, software, or a combination thereof.

Figure 2A:
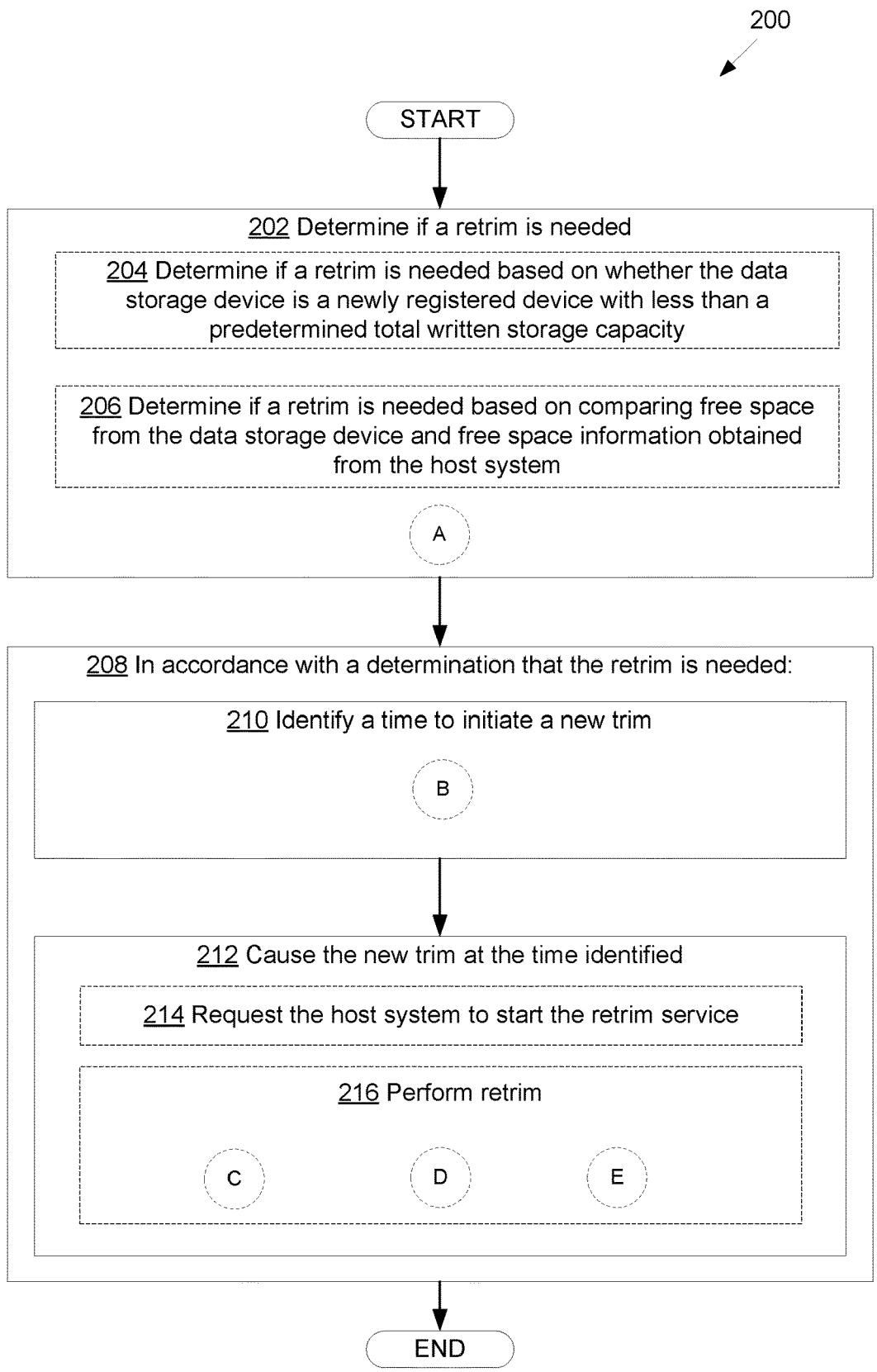

FIG. 2A is a flowchart depicting an example process (200) for performing a retrim command. The retrim module 110 may determine (202) if a retrim is necessary. In some aspects, the retrim module 110 may read removable storage device attributes. The removable storage device attributes read by the retrim module 110 may include data units written, power cycle count, power on hours, date, time, and/or other removable device attributes. The collection of the removable storage device attributes read by the retrim module may be known as the "timestamp."

The retrim module 110 may have access to the removable device's previous retrim timestamp in the prior trim information 112. Based on the timestamp, the retrim module 110 may determine that a retrim is not necessary in certain conditions. In some aspects, the retrim module 110 may determine (204) that a retrim is not necessary based on a determination of whether the removable device is newly registered with less than 10% total written volume of capacity. In some aspects, the retrim module 110 may determine that a retrim is not necessary based on if a retrim was issued within less than 7 days ago, if a retrim was issued within less than 10 power cycles ago, if namespace utilization is lower than 70%, if a retrim was issued within less than 4 power on hours ago, if a retrim was issued within less than 10% written volume of capacity, and/or if device namespace utilization is within less than 70%.

In some aspects, the retrim module 110 may determine (206) whether a retrim is needed based on a comparison between the free space from the removable device and the free space from the file system to determine whether the free space is in sync. If the free space is in sync, the retrim module 110 may determine that a retrim is not necessary.

If the retrim module 110 determines that a retrim is needed, the retrim module 110 identifies a time to initiate a new trim. In some aspects, the retrim module identifies the time to initiate a new trim by notifying the host system about the new trim. In some aspects, a notification may be sent to the user indicating that a retrim is needed. In some aspects, the retrim module 110 may wait for a period of low activity from the removable storage device before initiating a retrim.

In some aspects, the retrim module 110 may detect that the removable storage device has low activity by identifying the predetermined activity level based on if a change in the rate of data transferred to the storage device over a predetermined time period if below a predetermined rate. As a non-limiting example, for every 60 seconds, if the volume transferred in the last 60 seconds is less than 10 megabytes (MB), and volume transferred in the last 30 seconds is less than 5 MB, and volume transferred in the last 15 seconds is less than 2.5 MB, then the retrim module 110 may determine that the removable storage device is involved in low levels of activity and initiate a retrim. If the retrim module determines that the device is engaged in high enough levels of activity to postpone a retrim, the number of megabytes that need to be transferred to make the determination that the removable storage device is engaged in low levels of activity may increase before repeating the identification process again. Using the above example allows the retrim module 110 to eventually identify a relatively low activity period to perform a retrim. The numbers used in the above example are non-limiting and may change in various implementations.

Once the retrim module 110 has identified a time to initiate a new trim, the retrim module 110 may execute a retrim command in order to cause a new trim at the time identified. In some aspects, the retrim module 110 may request the host 104 to start a retrim service.

In some aspects, the retrim module 110, in accordance with a determination that the host 104 is unavailable to perform a retrim service, may perform the retrim service itself. In some aspects, the retrim module 110 may perform the retrim service by, once every second, repeating a series of steps while the trimmed clusters table 120 does not include all unused clusters 118. The retrim module 110 may obtain exclusive access to the removable storage device. Then, the retrim module 110 may use the file allocation table parser 116 to parse metadata in the file allocation table to determine unused clusters. In some aspects, the file allocation table parser 116 may use the trimmed clusters table 120 to determine unused clusters. Then, for a duration of one second, the retrim module 110 may issue a trim operation to trim the untrimmed clusters of the unused clusters. The retrim module 110 may update the trimmed clusters table 120 then release the exclusive access to the removable storage device.

In some aspects, the retrim module 110 may then mark the location of the existing logical block address (LBA) to resume trimming from that location on the next cycle. In some aspects, the retrim module 110 may mark the retrim operation complete and store the timestamp of the operation.

In one or more examples, each of the retrim module 110 and its components (e.g, an activity level determination module, and a file allocation table parser) may be a processor or a sub-processor. In one or more examples, a memory (e.g., a memory within the retrim module 110 or the controller 101) may include the unused clusters 118 and the trimmed clusters.

It may be instructive to describe the structures shown in FIGS. 1A and 1B with respect to FIGS. 2A-2H which is a flowchart illustrating an example process 200 for optimized read-modify-writes during relocation in a storage device, according to some embodiments. One or more blocks of FIG. 2A-2H may be executed by a computing system (including, e.g., a controller 107 of a flash memory, a retrim module 110, a data storage controller 101 of a data storage system 100 or a solid-state storage device (SSD), a processor, or the like). Examples of a computing system or a controller may be the controller 101. Similarly, a non-transitory machine-readable medium may include machine-executable instructions thereon that, when executed by a computer or machine, perform the processes of FIGS. 2A-2H. The steps of process 200 may be implemented as hardware, firmware, software, or a combination thereof.

In step 202, the controller 101 may determine if a retrim is needed. In some aspects, the controller 101 may determine if the retrim is needed based on determining (204) whether the data storage device is a newly registered device with less than a predetermined total written storage capacity. In some aspects, the controller 101 may determine if the retrim is needed based on comparing (206) free space from the data storage device and free space information obtained from the host system (e.g., the parser 116 may autonomously parse the file system and compare the file system view and device logical free space and/or use a host query to determine free space). Referring next to FIG. 2B, in some aspects, the controller 101 may determine if a retrim is needed based on timestamp attributes for prior trims (218). In some aspects, the timestamp attributes include (220) at least one of data units written, a power cycle count, power on hours, and a date and time for the prior trims. In some aspects, the controller determines if the retrim is needed based on the timestamp attributes by identifying (222) a condition selected from the group consisting of: a retrim issued less than a predetermined time in the past (224); a retrim issued less than a predetermined number of power cycles in the past (226); a retrim issued less than a predetermined number of power ons in the past (228); a retrim issued less than a predetermined percentage written storage capacity (230); and device namespace utilization is within less than a predetermined percentage (231).

Referring back to FIG. 2A, in step 208, the controller 101, in accordance with a determination that the retrim is needed (208), may identify (in step 210) a time to initiate a new trim, and may cause (in step 212) the new trim at the time identified. In some aspects, the controller 101 may request (214) the host system to start the retrim service. In some aspects, the controller 101 may perform (216) any of the steps described below in reference to FIGS. 2D, 2E and 2F.

Figure 2C:
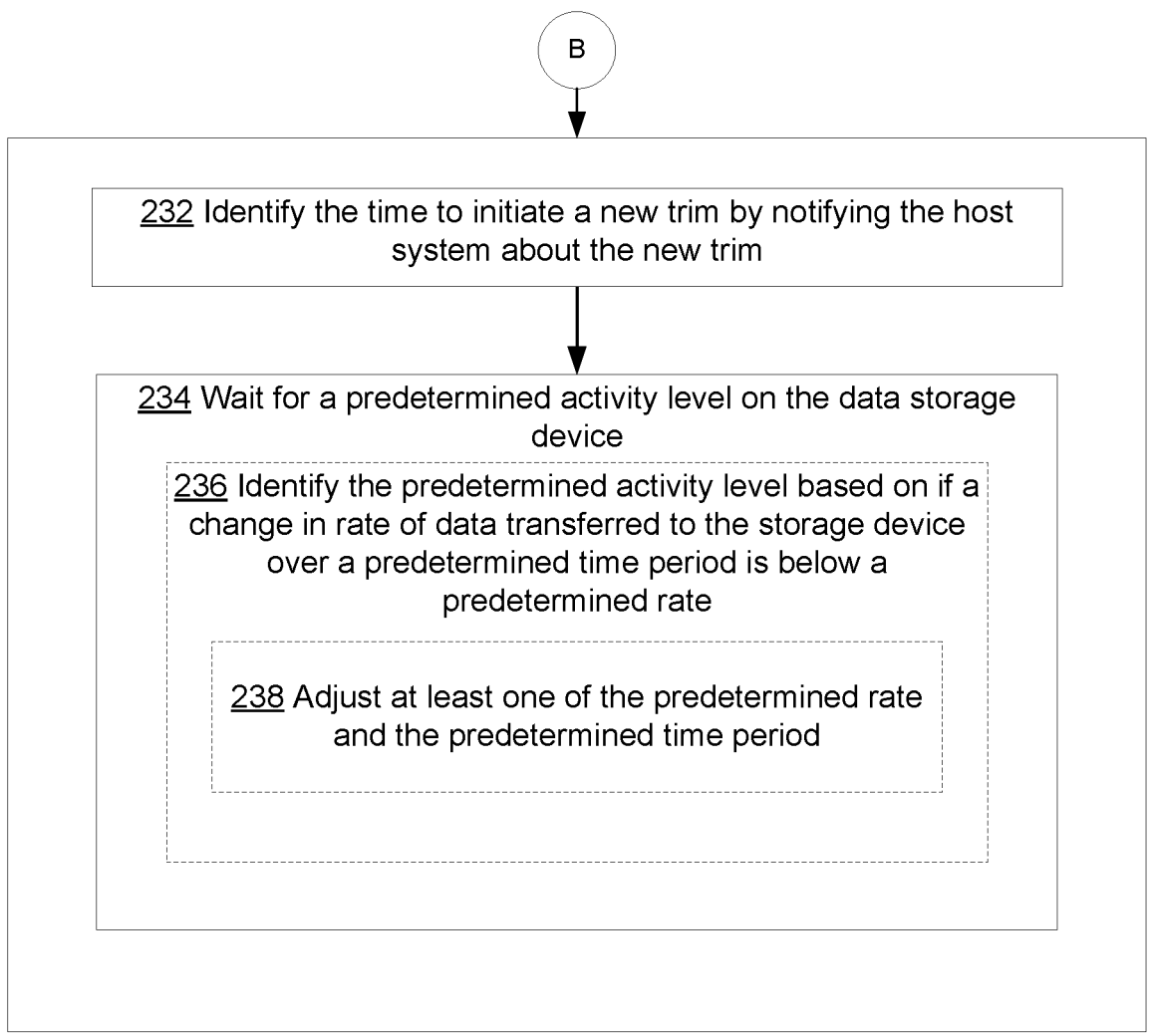

Referring next to FIG. 2C, in step 232, the controller may identify (232) the time to initiate a new trim by notifying the host system about the new trim. In some aspects, the controller 101 may wait (234) for a predetermined activity level on the data storage device. In some aspects, this step may be based on determining (236) if a change in rate of data transferred to the storage device over a predetermined time period is below a predetermined rate. The controller 101, in some aspects, adjusts (238) at least one of the predetermined rate and/or the predetermined time period. In some aspects, the steps 236 and 238 may be performed by the activity level determination module 114.

Figure 2D:
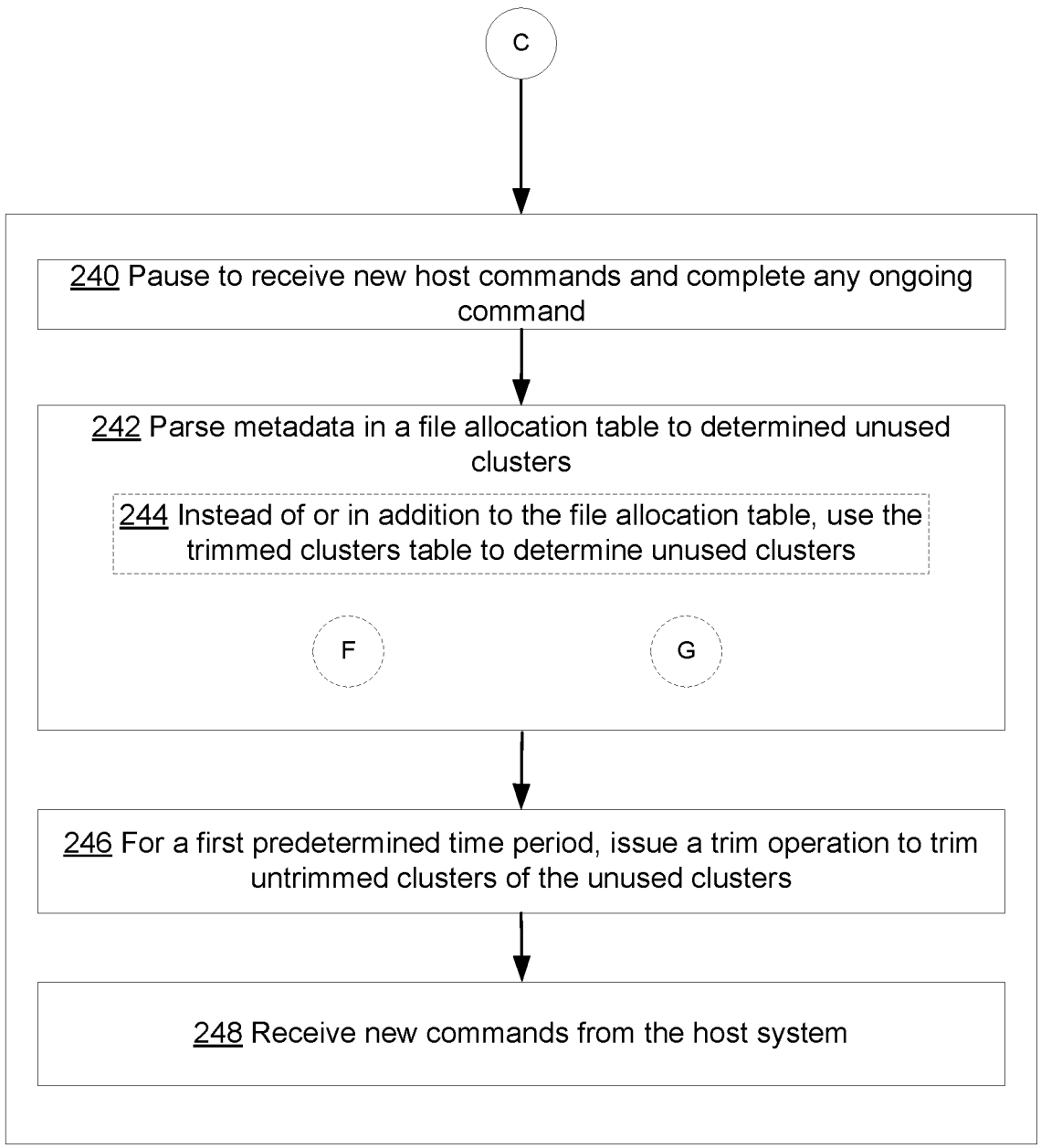

Referring next to FIG. 2D, in some aspects, the controller 101 may pause (240) to receive new host commands and complete any ongoing command; parse (242) metadata in a file allocation table to determine unused clusters; for a first predetermined time period, issue (246) a trim operation to trim untrimmed clusters of the unused clusters; and allow (248) receiving new commands from the host system. In some aspects, the controller 101 may use (244) a trimmed clusters table instead of or in addition to using the file allocation table to determine the unused clusters.

Figure 2E:
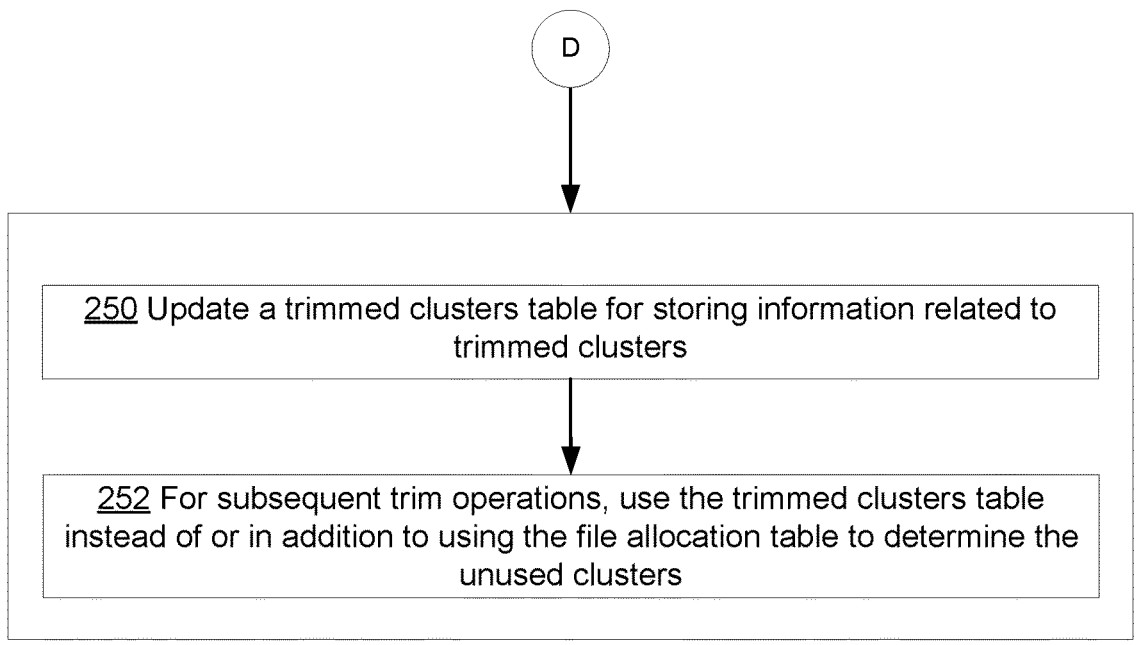

Referring next to FIG. 2E, in some aspects, the controller 101 may update (250) a trimmed clusters table for storing information related to trimmed clusters, and for subsequent trim operations, use (252) the trimmed clusters table instead of or in addition to using the file allocation table to determine the unused clusters.

Figure 2F:
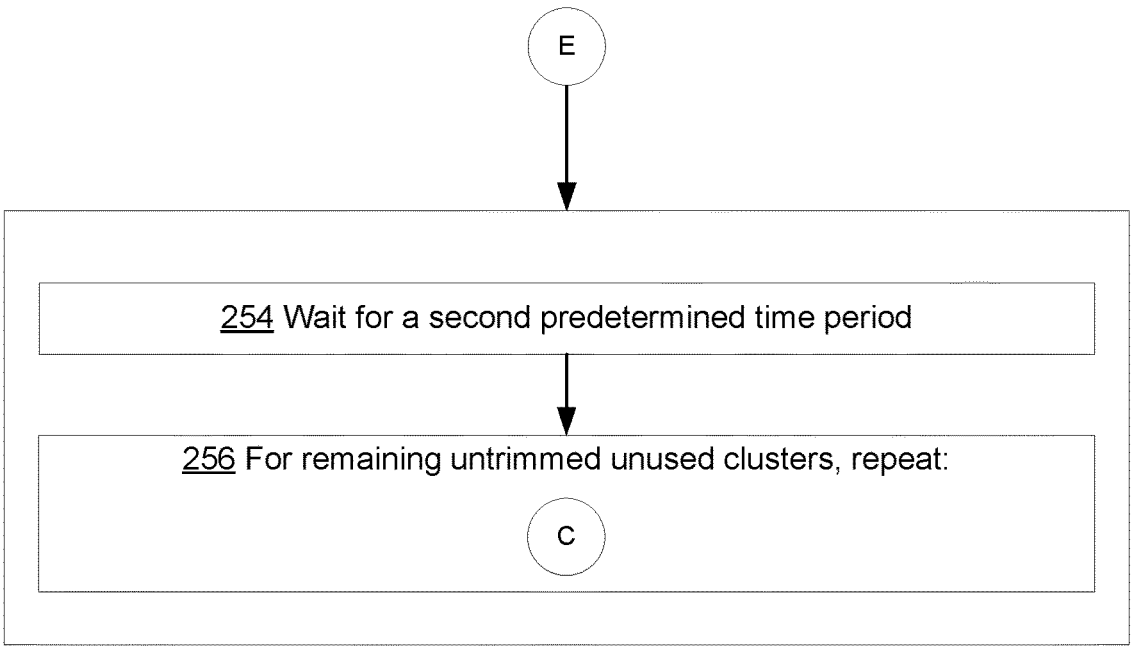

Referring next to FIG. 2F, in some aspects, the controller 101 may wait (254) for a second predetermined time period, and repeat (256) using a trimmed clusters table instead of or in addition to using the file allocation table to determine the unused clusters, and issuing the trim operation for the first predetermined time period, for remaining untrimmed unused clusters.

Figure 2G:
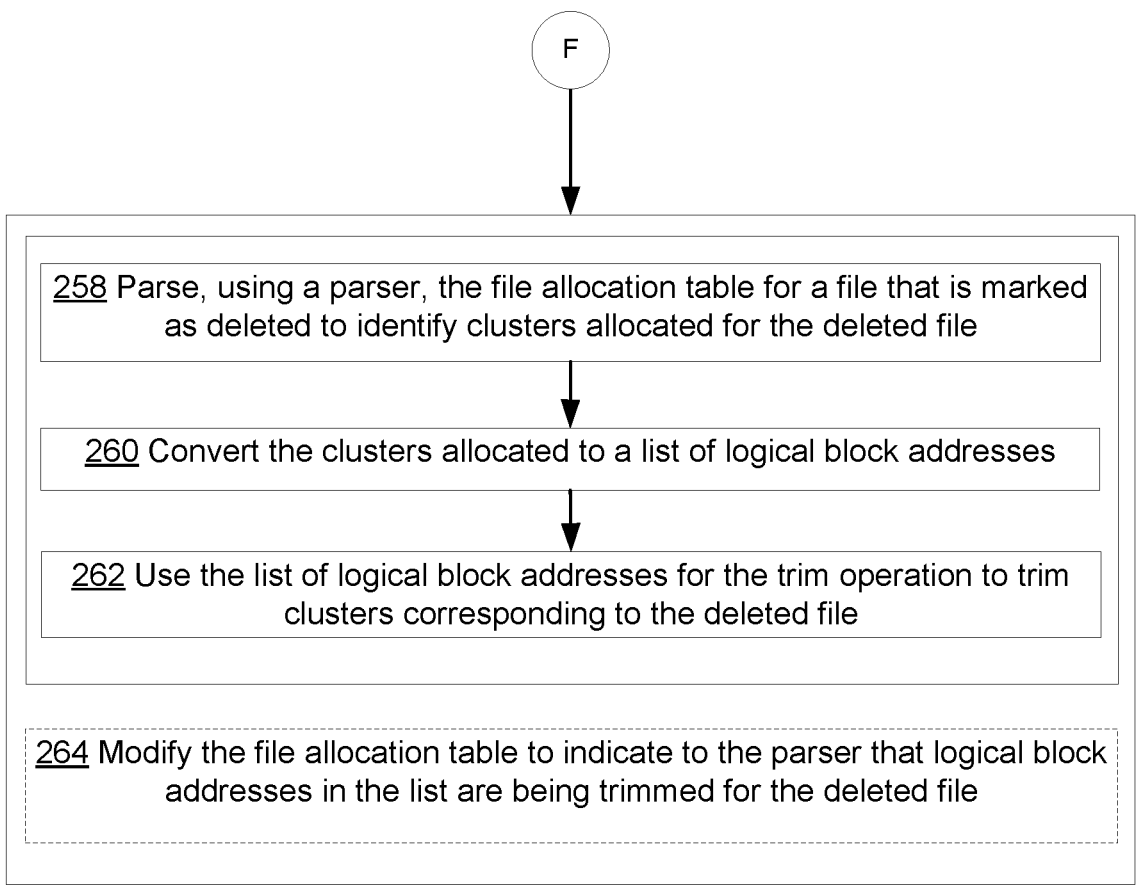

Referring next to FIG. 2G, in some aspects, the controller 101 may, parse (258), using a parser (e.g., the parser 116), the file allocation table for a file that is marked as deleted to identify clusters allocated for the deleted file; convert (260) the clusters allocated to a list of logical block addresses; and use (262) the list of logical block addresses for the trim operation to trim clusters corresponding to the deleted file. In some aspects, the controller 101 may modify (264) the file allocation table to indicate to the parser that logical block addresses in the list are being trimmed for the deleted file.

Figure 2H:
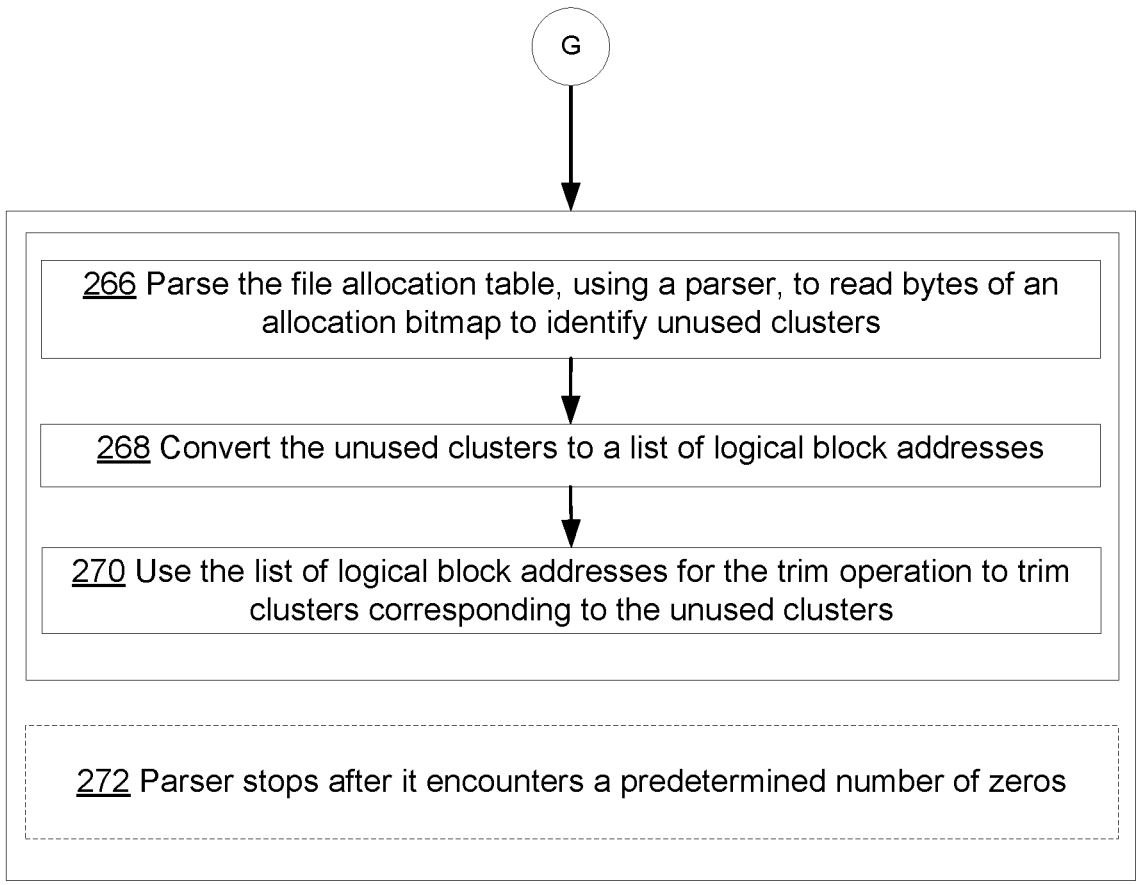

Referring next to FIG. 2H, in some aspects, the controller 101 may, parse (258), using a parser (e.g., the parser 116), the file allocation table, using a parser, to read (266) bytes of an allocation bitmap to identify unused clusters; convert (268) the unused clusters to a list of logical block addresses; and use (270) the list of logical block addresses for the trim operation to trim clusters corresponding to the unused clusters. In some aspects, the parser stops (272) after the parser encounters a predetermined number of zeros.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology One or more aspects of the subject technology provide a data storage device (e.g, the data storage system 100) that may include a host interface for coupling the data storage device to a host system; a device memory; and a controller configured to: determine if a retrim is needed for the data storage device; and in accordance with a determination that the retrim is needed: identify a time to initiate a new trim on the data storage device; and cause the new trim on the data storage device at the time identified.

In some aspects, the controller is further configured to determine if the retrim is needed based on timestamp attributes for prior trims on the data storage device.

In some aspects, the timestamp attributes include at least one of data units written, a power cycle count, power on hours, and a date and time for the prior trims.

In some aspects, the controller is further configured to determine if the retrim is needed based on the timestamp attributes by identifying a condition selected from the group consisting of: a retrim issued less than a predetermined time in the past; a retrim issued less than a predetermined number of power cycles in the past; a retrim issued less than a predetermined number of power ons in the past; a retrim issued less than a predetermined percentage written storage capacity; and device namespace utilization is within less than a predetermined percentage.

In some aspects, the controller is further configured to determine if the retrim is needed based on whether the data storage device is a newly registered device with less than a predetermined total written storage capacity.

In some aspects, the controller is further configured to determine if the retrim is needed based on comparing free space from the data storage device and free space information obtained from the host system.

In some aspects, the controller is further configured to: identify the time to initiate the new trim by notifying the host system about the new trim; and wait for a predetermined activity level on the data storage device.

In some aspects, the controller is further configured to identify the predetermined activity level based on if a change in rate of data transferred to the storage device over a predetermined time period is below a predetermined rate.

In some aspects, the controller is further configured to adjust at least one of the predetermined rate and the predetermined time period.

In some aspects, the controller is further configured to: cause the new trim on the data storage device at the time identified by requesting the host system to start a retrim service.

In some aspects, the controller is further configured to: pause to receive new host commands and complete any ongoing command; parse metadata in a file allocation table to determine unused clusters; for a first predetermined time period, issue a trim operation to trim untrimmed clusters of the unused clusters; and allow receiving new commands from the host system.

In some aspects, the controller is further configured to: update a trimmed clusters table for storing information related to trimmed clusters; and for subsequent trim operations, use the trimmed clusters table instead of or in addition to using the file allocation table to determine the unused clusters.

In some aspects, the controller is further configured to: wait for a second predetermined time period; and repeat using a trimmed clusters table instead of or in addition to u sing the file allocation table to determine the unused clusters, and issuing the trim operation for the first predetermined time period, for remaining untrimmed unused clusters.

In some aspects, the controller is further configured to: parse, using a parser, the file allocation table for a file that is marked as deleted to identify clusters allocated for the deleted file; convert the clusters allocated to a list of logical block addresses; and use the list of logical block addresses for the trim operation to trim clusters corresponding to the deleted file.

In some aspects, the controller is further configured to: modify the file allocation table to indicate to the parser that logical block addresses in the list are being trimmed for the deleted file.

In some aspects, the controller is further configured to: parse the file allocation table, using a parser, to read bytes of an allocation bitmap to identify unused clusters; convert the unused clusters to a list of logical block addresses; and use the list of logical block addresses for the trim operation to trim clusters corresponding to the unused clusters.

In some aspects, the device memory is configured as a hybrid single level cell (SLC) architecture, and the new trim is configured to create SLC burst space for the hybrid SLC architecture.

In some aspects, the data storage device is a removable storage device that is removable between a periodic retrim event of an operation system of the host system In other aspects, a method is implemented using one or more controllers for one or more storage devices. The method may include: determining if a retrim is needed for the data storage device; and in accordance with a determination that the retrim is needed: identifying a time to initiate a new trim on the data storage device; and causing the new trim on the data storage device at the time identified.

In further aspects, a system may include: means for determining if a retrim is needed for the data storage device; means for, in accordance with a determination that the retrim is needed, identifying a time to initiate a new trim on the data storage device; and means for, in accordance with a determination that the retrim is needed, causing the new trim on the data storage device at the time identified.

Various implementations of the methods and systems may be used for retrimming removable storage devices. The techniques described herein may be used to reduce solid state drive (SSD) random access memory (RAM) footprint, and provide performance advantages that improve the functioning of the storage device or SSD.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the terms "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order, with the exception of steps and/or operations necessarily occurring in a particular order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not b e limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may be omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

The shapes, sizes, areas, ratios, numbers, and the like disclosed in the drawings for describing implementations of the present disclosure are merely examples, and thus, the present disclosure is not limited to the illustrated details.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not b e used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A data storage device, comprising:
    a host interface for coupling the data storage device to a host system;
    a device memory; and
    a controller configured to:
        determine if a retrim is needed for the data storage device; and
        in accordance with a determination that the retrim is needed:
            identify a time to initiate a new trim on the data storage device; and
            cause the new trim on the data storage device at the time identified,
    wherein the controller is configured to determine if the retrim is needed based on timestamp attributes for prior trims on the data storage device.

2. The data storage device of claim 1, wherein the timestamp attributes include at least one of data units written, a power cycle count, power on hours, and a date and time for the prior trims.

3. The data storage device of claim 1, wherein the controller is further configured to determine if the retrim is needed based on the timestamp attributes by identifying a condition selected from the group consisting of:
    a retrim issued less than a predetermined time in a past;
    a retrim issued less than a predetermined number of power cycles in the past;
    a retrim issued less than a predetermined number of power ons in the past;
    a retrim issued less than a predetermined percentage written storage capacity; and
    device namespace utilization is within less than a predetermined percentage.

4. The data storage device of claim 1, wherein the controller is further configured to determine if the retrim is needed based on whether the data storage device is a newly registered device with less than a predetermined total written storage capacity.

5. The data storage device of claim 1, wherein the controller is further configured to determine if the retrim is needed based on comparing free space from the data storage device and free space information obtained from the host system.

6. The data storage device of claim 1, wherein the controller is further configured to:
    identify the time to initiate the new trim by notifying the host system about the new trim; and
    wait for a predetermined activity level on the data storage device.

7. The data storage device of claim 6, wherein the controller is further configured to identify the predetermined activity level based on if a change in rate of data transferred to the data storage device over a predetermined time period is below a predetermined rate.

8. The data storage device of claim 7, wherein the controller is further configured to adjust at least one of the predetermined rate and the predetermined time period.

9. The data storage device of claim 1, wherein the controller is further configured to:
    cause the new trim on the data storage device at the time identified by requesting the host system to start a retrim service.

10. The data storage device of claim 1, wherein the controller is further configured to:
    pause to receive new host commands and complete any ongoing command;
    parse metadata in a file allocation table to determine unused clusters;
    for a first predetermined time period, issue a trim operation to trim untrimmed clusters of the unused clusters; and
    allow receiving new commands from the host system.

11. The data storage device of claim 10, wherein the controller is further configured to:
    update a trimmed clusters table for storing information related to trimmed clusters; and for subsequent trim operations, use the trimmed clusters table instead of or in addition to using the file allocation table to determine the unused clusters.

12. The data storage device of claim 10, wherein the controller is further configured to:
    wait for a second predetermined time period; and
    repeat using a trimmed clusters table instead of or in addition to using the file allocation table to determine the unused clusters, and issuing the trim operation for the first predetermined time period, for remaining untrimmed unused clusters.

13. The data storage device of claim 10, wherein the controller is further configured to:
    parse, using a parser, the file allocation table for a file that is marked as deleted to identify clusters allocated for the deleted file;
    convert the clusters allocated to a list of logical block addresses; and
    use the list of logical block addresses for the trim operation to trim clusters corresponding to the deleted file.

14. The data storage device of claim 13, wherein the controller is further configured to:
    modify the file allocation table to indicate to the parser that logical block addresses in the list are being trimmed for the deleted file.

15. The data storage device of claim 10, wherein the controller is further configured to:
    parse the file allocation table, using a parser, to read bytes of an allocation bitmap to identify unused clusters;
    convert the unused clusters to a list of logical block addresses; and
    use the list of logical block addresses for the trim operation to trim clusters corresponding to the unused clusters.

16. A method implemented using one or more controllers for one or more storage devices, the method comprising:
    determining if a retrim is needed for a data storage device; and
    in accordance with a determination that the retrim is needed:
        identifying a time to initiate a new trim on the data storage device; and
        causing the new trim on the data storage device at the time identified,
    wherein the determining comprises determining if the retrim is needed based on whether the data storage device is a newly registered device with less than a predetermined total written storage capacity.

17. The method of claim 16, further comprising:
    determining if the retrim is needed based on comparing free space from the data storage device and free space information obtained from a host system.

18. The method of claim 16, wherein:
    the identifying comprises identifying the time to initiate the new trim by notifying a host system about the new trim; and
    the method comprises waiting for a predetermined activity level on the data storage device.

19. A system, comprising:
    means for determining if a retrim is needed for a data storage device;
    means for, in accordance with a determination that the retrim is needed, identifying a time to initiate a new trim on the data storage device;
    means for, in accordance with a determination that the retrim is needed, causing the new trim on the data storage device at the time identified; and
    means for determining if the retrim is needed based on comparing free space from the data storage device and free space information obtained from a host system.

20. The system of claim 19, comprising:
    means for determining if the retrim is needed based on timestamp attributes for prior trims on the data storage device.

* * * * *